No. 655,185. Patented Aug. 7, 1900.
W. A. BERNARD.
DIVIDERS.
(Application filed May 16, 1900.)
(No Model.)
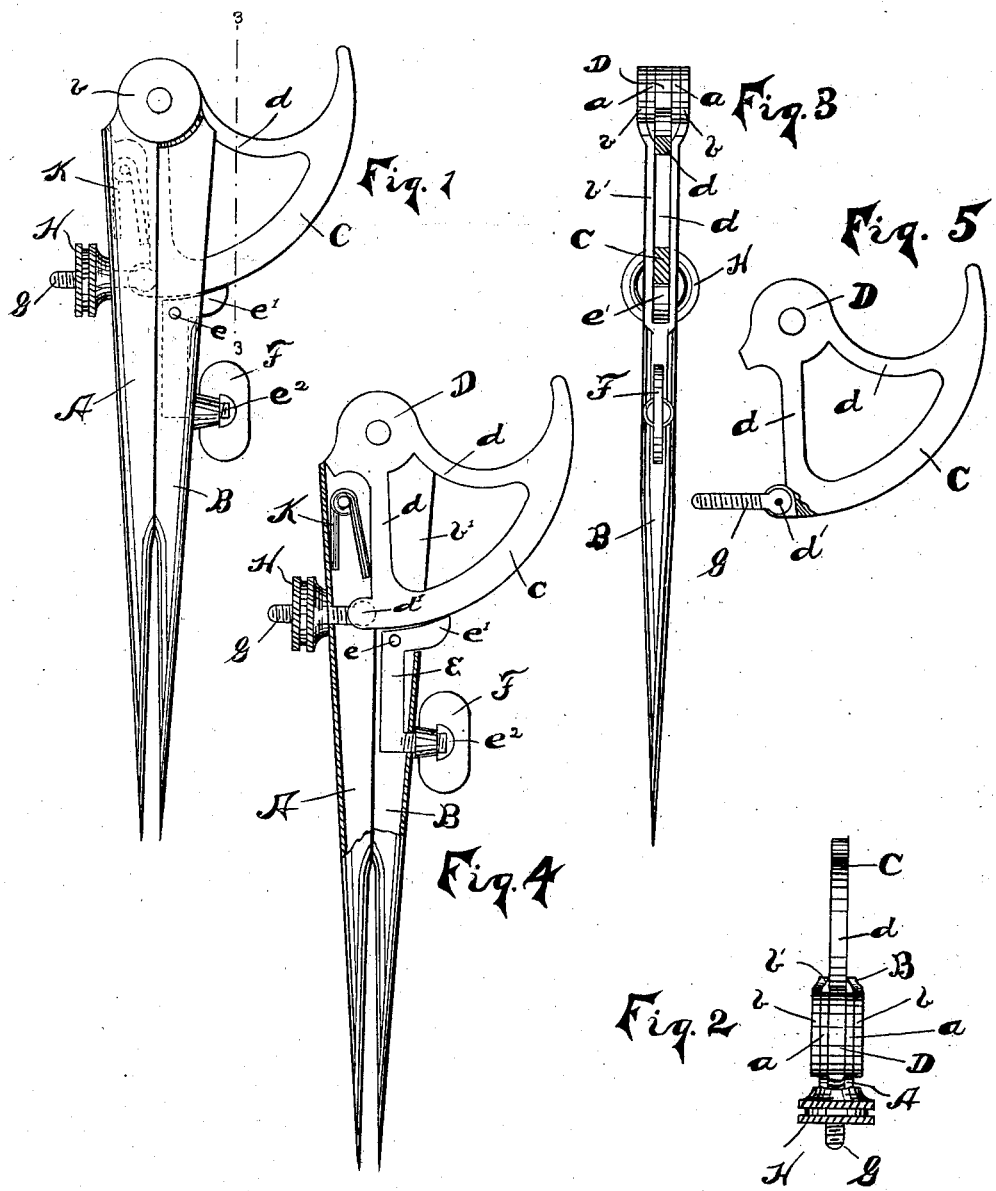

UNITED STATES PATENT OFFICE.

WILLIAM A. BERNARD, OF NEW HAVEN, CONNECTICUT, ASSIGNOR TO THE WILLIAM SCHOLLHORN COMPANY, OF SAME PLACE.

DIVIDERS.

SPECIFICATION forming part of Letters Patent No. 655,185, dated August 7, 1900.

Application filed May 16, 1900. Serial No. 16,924. (No model.)

*To all whom it may concern:*

Be it known that I, WILLIAM A. BERNARD, of the city and county of New Haven, in the State of Connecticut, have invented a new and useful Improvement in Dividers, of which the following is a full, clear, and exact description when taken in connection with the drawings, which form a part thereof, and in which—

Figure 1 represents a side elevation of the dividers; Fig. 2, a top view; Fig. 3, a vertical section on lines 3 3 of Fig. 1; Fig. 4, a side elevation, as in Fig. 1, partly broken away; Fig. 5, a detail view of wing.

In all figures similar letters of reference represent like parts.

This invention relates to an improvement in dividers, calipers, compasses, and similar instruments of precision; and it consists in the production of a light, strong, and inexpensive instrument capable of peculiarly-nice adjustment and having the various improvements and combinations of parts set forth and claimed hereinafter.

Referring to the drawings, the parts designated by the letters A and B represent the legs, of which the upper portions are made U-shaped in cross-section, the lower portions being circular and tapering to a point, as in the ordinary form of dividers. Each of the legs is provided at the upper end with disks $a\ b$, the disks upon one of the legs lying in the planes of the sides of said leg, and the disks of the other leg being offset outward sufficiently to inclose the other disks, Figs. 2 and 3.

An arc-shaped wing C has a disk D formed integral therewith or connected thereto by substantially-radial arms $d$, the center of the disk being the center of the circle of which the wing forms an arc. The disk of the wing is placed between the inner pair of the disks of the legs, where it acts as a washer, all the disks having a common pivot, Figs. 2 and 3. Owing to the connection between the wing and the washer a greater rigidity is obtained when the legs are locked upon the wing than is possible in instruments in which the wing and washer are separate. The back of one of the legs B is longitudinally slotted at $b'$ in order to allow the leg B to swing freely upon the pivot unobstructed by the wing and arms which pass through the slot thus made between the sides of the leg. The leg B may be locked upon the wing C by means of the locking-piece E, pivoted within the leg B at $e$. The upper portion of this locking-piece has a lateral extension $e'$, which in its normal position lies a slight distance away from the base of the wing. The other end of the locking-piece extends downward and is provided with a laterally-extending stud $e^2$, which projects through an opening in the leg and is threaded to engage a thumb-nut F. By tightening the thumb-nut F the locking-piece E is turned on its pivot $e$ and the laterally-projecting end $e'$ made to bind on the wing C, Fig. 4. At the inner end of the wing is pivoted at $d'$ a screw G, which passes through an opening in the leg A, on the outer side of which it is engaged by a thumb-nut H. Housed in the leg A and bearing on the inner side of the leg and the wing or one of its integrally-formed radial arms is a spring K, which forces the wing as far from the leg as the nut H on the screw G will permit. The leg B having been locked upon the wing C, a nice adjustment at any angle may be obtained by turning the thumb-nut H on the screw G, which is permitted to follow substantially the line of movement of the wing by means of its pivoted connection therewith.

Having now described my invention, what I claim, and desire to secure by Letters Patent, is—

1. In dividers or similar tools, the combination with a pair of legs; of a separate wing having a bearing on the pivot of the tool and capable of movement independent of the movement of the legs, substantially as described.

2. In dividers or similar tools, the combination with a pair of legs; of a separate wing having a rigid connection with the washer pivoted to swing independently between the bearing-surfaces of the legs; means for locking one of the legs upon the wing, substantially as described.

3. In dividers or similar tools, the combination with a pair of legs; of a wing; a screw pivoted to the wing; a nut mounted on said screw and adapted to limit the movement of one of said legs; substantially as described.

4. In dividers or similar tools, the combination with a pair of legs; of a separate wing having a rigid connection with the washer pivoted between the bearing-surfaces of the legs; a screw attached to the wing; a nut mounted on said screw and adapted to limit the movement of one of said legs, and means for locking the other leg to said wing; substantially as described.

5. In dividers or similar tools, the combination with a pair of legs, one of which is U-shaped in cross-section; of a wing having a rigid connection with the washer pivoted between the bearing-surfaces of the legs; a spring housed within said U-shaped leg and bearing against said rigid connection of said wing and washer to force said wing and leg apart; and mechanism for drawing said wing and leg together, substantially as described.

6. In dividers or similar tools, the combination with a pair of legs, one of which is made U-shaped in cross-section; of a separate wing having a bearing on the pivot of the tool, and capable of movement independent of the movement of the legs; a locking-piece pivoted within one of said U-shaped legs and made to bind on said wing by the operation of a thumb-nut; and a yielding connection between the other of said legs and said wing; substantially as described.

7. In dividers or similar tools, the combination with a pair of legs made U-shaped in cross-section; of a separate wing, having a rigid connection with the washer pivoted between the bearing-surfaces of the legs, and capable of movement independent of the movement of either leg; a locking-piece in one U-shaped leg for locking said leg upon said wing; a spring housed in the other of said legs and bearing against said wing; a screw pivoted to the wing; a nut mounted on said screw and adapted to limit the movement of said legs against the tension of said spring, substantially as described.

In witness whereof I have hereunto set my hand this 15th day of May, 1900.

WILLIAM A. BERNARD.

Witnesses:
 SAMUEL H. FISHER,
 ELIZABETH K. PENDLETON.